United States Patent [19]

Daniels

[11] Patent Number: 4,595,984
[45] Date of Patent: Jun. 17, 1986

[54] APPARATUS AND METHOD FOR DETERMINING SPECIAL POSTAGE FEES

[75] Inventor: Edward P. Daniels, Bridgeport, Conn.

[73] Assignee: Pitney Bowes Inc., Stamford, Conn.

[21] Appl. No.: 436,123

[22] Filed: Oct. 22, 1982

[51] Int. Cl.⁴ .................. G06F 15/20; G06F 15/30
[52] U.S. Cl. ................................ 364/466; 364/900
[58] Field of Search ... 364/200 MS File, 900 MS File, 364/466

[56] References Cited

U.S. PATENT DOCUMENTS 4,271,470 6/1981 Dlugos et al. .................. 364/466
4,286,325 8/1981 Dlugos et al. .................. 364/900

Primary Examiner—Gareth D. Shaw
Assistant Examiner—Daniel K. Dorsey
Attorney, Agent, or Firm—Robert H. Whisker; David E. Pitchenik; William D. Soltow, Jr.

[57] ABSTRACT

A postage calculator system and method comprising means for introducing postal information to the system; a means for obtaining weight information of the article to be mailed; a memory means for storing information indicative of special feed categories; and means for generating a postage value for the article from the postal information, the weight information and the special fee information. The system selects postal information indicative of the carrier type, class and destination of an article to be mailed, obtains weight information for the article, selects special fee information indicative of at least one of the following special fee categories for use with the article: registered mail, special delivery, return receipt, certified mail, insurance and C.O.D. The system then generates a postage value, adjusted in accordance with the special fees, if any, determined, for the article. For certain special fees which are determined according to an entered dollar value for the article to be mailed the system provides a capability for handling dollar values in excess of the normal maximum dollar value which can be entered.

17 Claims, 18 Drawing Figures

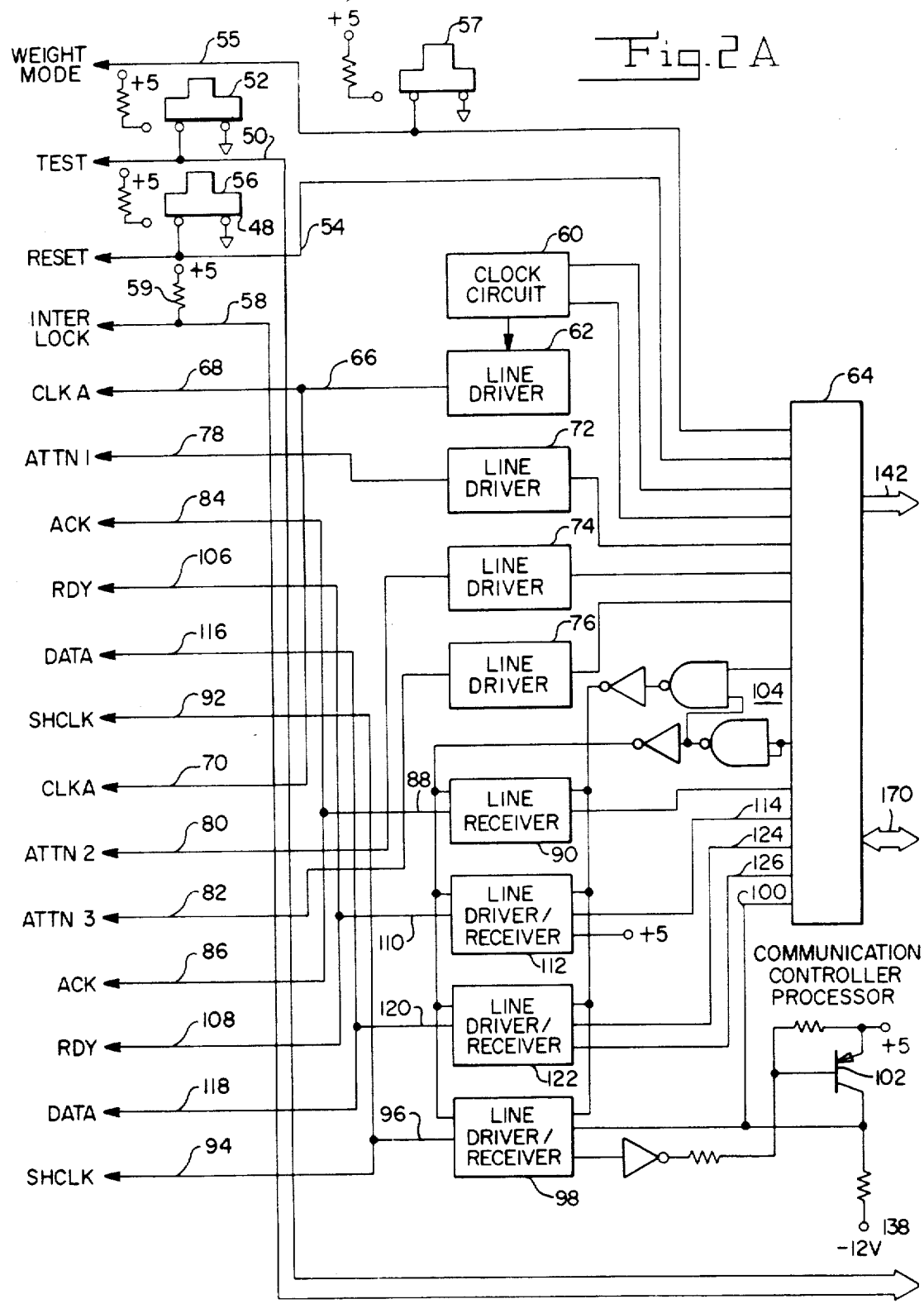

| B7 | B6 | B5 | B4 | B3 | B2 ← — B0 |
|---|---|---|---|---|---|
| 1 ADD TO TOTAL | SF KEY | WGT | INS | 1 ADD | NUMBER OF RESTRICTIONS |
| 0 REPLACE RATE WITH FEE | | | | 0 SUBTRACT | |

_Fig. 12_

| B7 | B6 | B5 ← — B4 | B3 | B2 ← — B0 |
|---|---|---|---|---|
| 1 WGT | 1 POUNDS | NUMBER OF VALUE BYTES | 1 DATA > | NUMBER OF VALUE SETS |
| 0 VALUE | 0 OUNCES | | 0 DATA < | |

_Fig. 14_

| B7 | B6 | B5 | B4 | B3 | B2 ← — B0 |
|---|---|---|---|---|---|
| 1 | 1 | 1 | 1 DOLLARS | 1 BYTES = 1+ | NUMBER OF |
| | | | 0 CENTS | 0 BYTES = BYTES | |

_Fig. 15_

| B7 | B6 | B5 | B4 | B3 | B2 ← — B0 |
|---|---|---|---|---|---|
| 1 | 1 | 1 DOLLAR HEADER | 1 DOLLARS | 1 BYTES = 1+ | NUMBER OF |
| | | 0 WGT / VALUE HEADER | 0 CENTS | 0 BYTES = BYTES | |

_Fig. 13_

| B7 | B6 | B5 | B4 | B3 | B2 | B1 | B0 |
|---|---|---|---|---|---|---|---|
| 1 | INT'L. SURFACE | INT'L AIR | LIBRARY | BOOK | EXPRESS | 3rd/4th CLASS | 1st CLASS PRIORITY |

_Fig. 9_

| B7 | B6 ← ——— B3 | B2 | B1 | B0 |
|---|---|---|---|---|
| ∅ | UNUSED | AIR MAIL | INTRA-STATE | INTER-STATE |

Fig.10

| B7 | B6 | B5 | B4 | B3 | B2 | B1 | B0 |
|---|---|---|---|---|---|---|---|
| RET. REC. | REG. | CERT. | SPEC. DEL. | INS. | SPEC. HAND. | C.O.D. | NO KEY S.F. |

Fig.11

APPARATUS AND METHOD FOR DETERMINING SPECIAL POSTAGE FEES

BACKGROUND OF THE INVENTION

This invention relates to a method and apparatus for determining postage values applicable to items to be mailed. More particularly it relates to such method and apparatus wherein a base postage value is determined for each such item and special fees applicable to each such item if any, are also determined for each such item and the base postage value is adjusted in accordance with such special fees. Still more particularly it relates to a postage meter system incorporating such method and apparatus.

Apparatus for determining postage values are known. Exemplary of such apparatus are the apparatus disclosed in U.S. Pat. No. 4,325,440, to Crowley et al, for Method and Apparatus for Computing Special Fees in a Parcel Postage Metering System and in U.S. Pat. No. 4,286,325 to Dlugos et al, for System and Method for Computing Domestic and International Postage, both of which are hereby incorporated by reference.

Together these patents disclosed apparatus and methods for determining a base postage value for an item to be mailed and for determining special fees applicable to such item and adjusting the base value in accordance with such special fees. More particularly these patents disclose an apparatus and method capable of determining "dollar value oriented" special fees; that is, special fees, such as for registration or insurance, which are determined by a dollar value associated with the item to be mailed and entered into the system by an operator.

Recently there has arisen with inflation a need for the capability to handle large dollar values for such special fees. Thus the need to insure items to be mailed for amounts in excess of $1,000,000 is not uncommon. Such amounts are larger than the largest amount which can be expressed in the number of digits allowed in the prior art; typically five, limiting the maximum expressable amount to $99,999. While it would be possible, in principle, to extend the range of the dollar amounts in the prior art systems such extension would require extensive redesign and modification of both the hardware and software of the prior art systems. Further, since postage meter systems are effectively machines for spending money reliability and confidence in that reliability are of the utmost importance.

Thus it is an object of the present invention to provide a method and apparatus capable of determining dollar value oriented special fees based on dollar values larger then the maximum amount which can be expressed in the number of digits previously allowed.

It is a further object to provide such capability with only minimal changes in what are a highly reliable, well tested, well excepted systems.

BRIEF SUMMARY OF THE INVENTION

The above objects are achieved and the disadvantages of the prior art are overcome by the apparatus of the subject invention which comprises a device for determining the weight of items to be mailed and a device, such as a keyboard, for entering data necessary to determine the postage value applicable to each item. The data includes data defining special fees, if any, applicable to each of said items. A data processor is operatively associated with the weight determining device and the data entry device to determine the postage applicable to each item. The data processor further comprises a memory for storing first tables of data defining base postage rates and second tables defining special fee rates; the special fees including "dollar value oriented" special fees which are determined in accordance with an entered dollar value. The second tables include two section tables defining special fee rates for dollar value oriented special fees which may be determined in accordance with entered dollar values, which may be greater than a predetermined amount. The two section tables include a lower section defining special fee rates for entered dollar values ranging up to and including the predetermined amount in unit increments and an upper section defining special fee rates for entered dollar values ranging up from the predetermined amount in increments greater than unity. The data processor responds to the determined weights and other applicable entered data to select a base postage value for each item and responds to the determined weights and entered data, as applicable, to select special fee values for items requiring special fees from said second tables. The data processor than adjusts the base postage value in accordance with the determined special fee and outputs the adjusted value. For items requiring a dollar value oriented special fee, which is determined in accordance with an entered dollar amount which may be greater than the predetermined amount the data processor determines the special fee values from a two section table; selecting the special fee amounts from the lower sections of the tables, when the entered dollar value is less or equal to than the predetermined amount, in accordance with the dollar amount as entered, and selecting the special fee values from the upper sections of the tables when the entered dollar value is greater than the predetermined amount, in accordance with the entered dollar value as appropriately rounded.

In the operation of the apparatus of the subject invention the weight of an item to be mailed is determined, and entered into the data processor, either by using the weight determining device of the apparatus or by entering a previously determined weight. Data necessary to determine the applicable postage value is entered into the data processor through the data entry device. The entered data includes data necessary to determine a base postage value and, for items requiring a special fee based on a dollar value which may be greater than the predetermined amount, the entered data includes such dollar value. The data processor identifies, in accordance with the entered data, a first table defining a base postage rate and selects, in accordance with the determined weight and the entered data, a base postage value applicable to the item. The processor then identifies a second table, defining special fees, if any, applicable to the item. If a special fee is determined by an entered dollar amount which may be greater than the predetermined amount the second table is a two section table as described above. If such entered dollar value is less than or equal to the predetermined amount the processor selects the appropriate special fee value from the lower section in accordance with the dollar value as entered and if such entered dollar value is greater than the predetermined amount the processor selects the appropriate special fee value from the upper section of the table in accordance with entered dollar value as appropriately rounded. The data processor then adjusts the base postage value in accordance with the so determined special fee and other special fees, if any, and outputs the adjusted value to a printer so that appropriate postage indicia are printed and applied to the item.

In a preferred embodiment of the subject invention the predetermined amount is the maximum amount expressable in a predetermined number of digits.

Thus the subject invention advantageously supplies an apparatus and method for determining postage values including dollar oriented special fees which are determined in accordance with a dollar value which is larger than values which could be handled by the prior art while maintaining the high reliability and confidence which had been established in the prior art.

It is another advantage of the subject invention that since the range of dollar values has increments greater than unity above a predetermined amount the range of dollar amounts may be extended without proportionately extending the memory storage requirements for the associated special fee rate tables.

Other objects and advantages of the subject invention will be apparent to those skilled in the art from a consideration of the attached drawings and the detailed description of an embodiment of the invention set forth below.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 9 shows the format of a rate key code byte used in the USPS system.

FIG. 10 shows the format of a rate key code byte used in the USPS system.

FIG. 11 shows the format of a rate key screen.

FIG. 12 shows the format of a special fee main header.

FIG. 13 shows the format of a special fee sub- header.

FIG. 14 shows the format of a special fee chart header.

FIG. 15 shows the format of a special fee dollar header.

DESCRIPTION OF PREFERRED EMBODIMENT OF THE INVENTION

Figure 1:
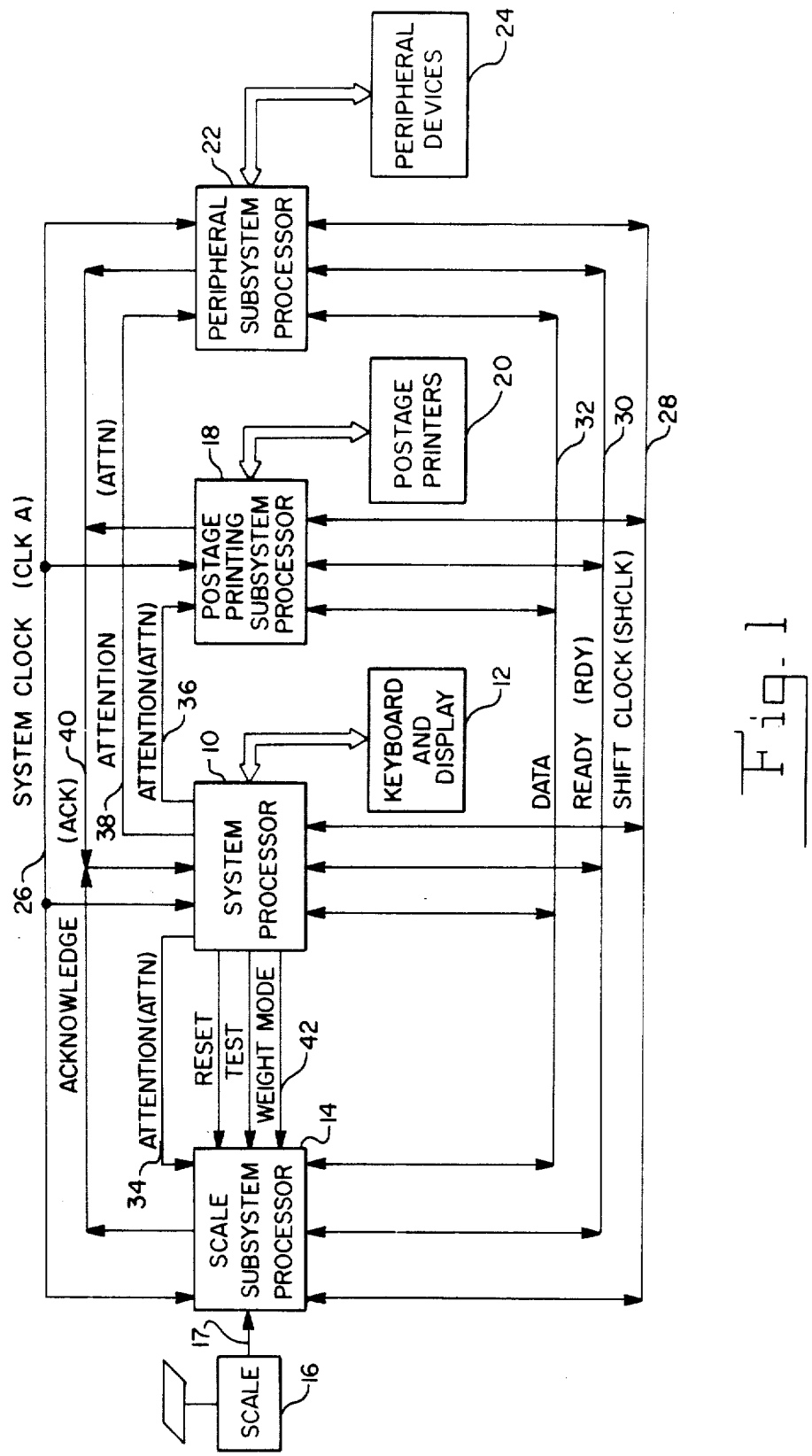
FIG. 1 is a block diagram of the major components of a multi-processor system in accordance with the present invention.

Referring to FIG. 1, the central component of the multiprocessor parcel postage metering system shown there is a system processor 10 which interfaces with a system user through an input/output subsystem 12 including a keyboard and a visual display. In preferred embodiment of the invention, the keyboard is used to enter data concerning class of service, destination zone or country of destination, special fees and the like. In one embodiment of the invention, the first three digits of the zip codes for the point of origin and point of destination of a Parcel may be entered through the keyboard. A zip-to-zone subroutine programmed into the system processor would convert the entered data to zone information. The display may be a seven-segment digit display indicating the weight of a parcel in metric or English units, its destination zone, a country code for international mailings and the required postage. In a preferred embodiment, the system would provide visual error codes to inform the user of certain types of system errors.

The system processor 10 is adapted to receive weight-indicating signals from a scale subsystem processor 14 which provides an encoded weight signal representing a parcel weight in pounds, ounces and fraction of ounces, or, in the metric system, in kilograms and grams.

The system processor 10 is also connected to a postage printing subsystem processor 18 which sets and operates one or more postage printers 20. The connection between the postage printing subsystem processor 18 and the postage printers 20 is shown as bidirectional since the postage printers include sensors which supply signals to the subsystem processor representing the current setting of each printer.

The system processor 10 may also communicate with a peripherals subsystem processor 22 which can control and monitor a number of peripheral devices 24, including, for example, a parcel identification number counter of the type used for United Parcel Service postage transactions, a document printer which would provide a written record of the postage transactions occurring within the system, and a floppy disc unit or magnetic tape unit for providing magnetic record storage of the system transactions.

Operations within the multiprocessor system are controlled by system clock signals generated within the system processor 10 and applied to the processors 14, 18 and 22 over a common clock bus 26.

Other connections from the system processor 10 which are common to the other processors in the overall system include a shift clock (SHCLK) bus 28, a ready (RDY) bus 30 and the serial data bus 32. Each of these busses is bidirectional. That is, 14, 18 or 22 are sent via the appropriate bus to the system processor 10 or at the system processor 10 and sent over the same bus to one of the subsystem processors. Generally, the SHCLK signals carried by bus 28 are used in shifting data from a transmitting processor to a receiving processor. The RDY signals on bus 30 provide a signal to the receiving processor that the transmitting processor is enabled to transmit binary data over the serial data bus 32.

Interprocessor communications are controlled by the system processor 10 which, operating under the control of a stored program, addresses any of the other processors with which data is to be exchanged by means of an attention (ATTN) signal. Individual connections from the system processor to the other processors carry these ATTN signals. Unlike the other earlier-discussed busses, each ATTN line runs between the system processor 10 and only one of the subsystem processors in the system. More specifically, ATTN line 34 connects the system processor 10 to the scale subsystem processor 14, ATTN line 36 connects system processor 10 to the postage printing subsystem processor 18 and ATTN line 38 connects the peripherals subsystem processor 22 to the system processor 10.

Each of the subsystem processors 14, 18 and 22 can respond to an ATTN signal transmitted over fts dedicated attention line by returning an acknowledge (ACK) signal to the system processor over a common bus 40. The bus 40 can be shared by the subsystem processor since it can logically be assumed that only the subsystem processor which is being addressed over its dedicated attention line will be replying with an ACK signal.

The system processor 10 and the scale subsystem processor 14 are additionally connected by reset, test and weight mode connections 42 which give the system processor 10 a limited amount of control over the operation of the scale subsystem processor 14.

Figure 2B:
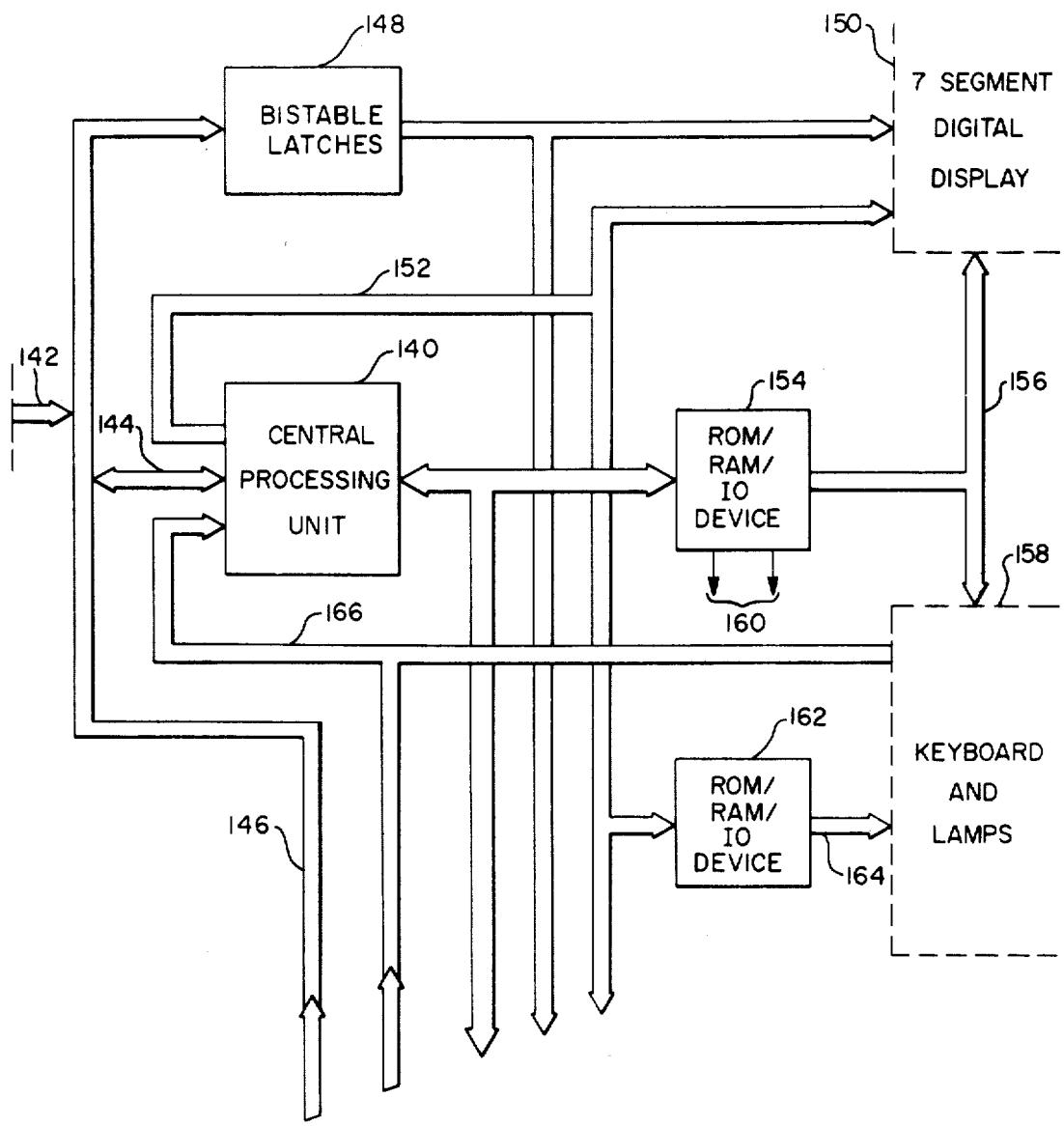
FIG. 2, comprising FIGS. 2a, 2b and 2c taken together, a more detailed schematic diagram of the system processor in the system of FIG. 1.
Figure 2C:
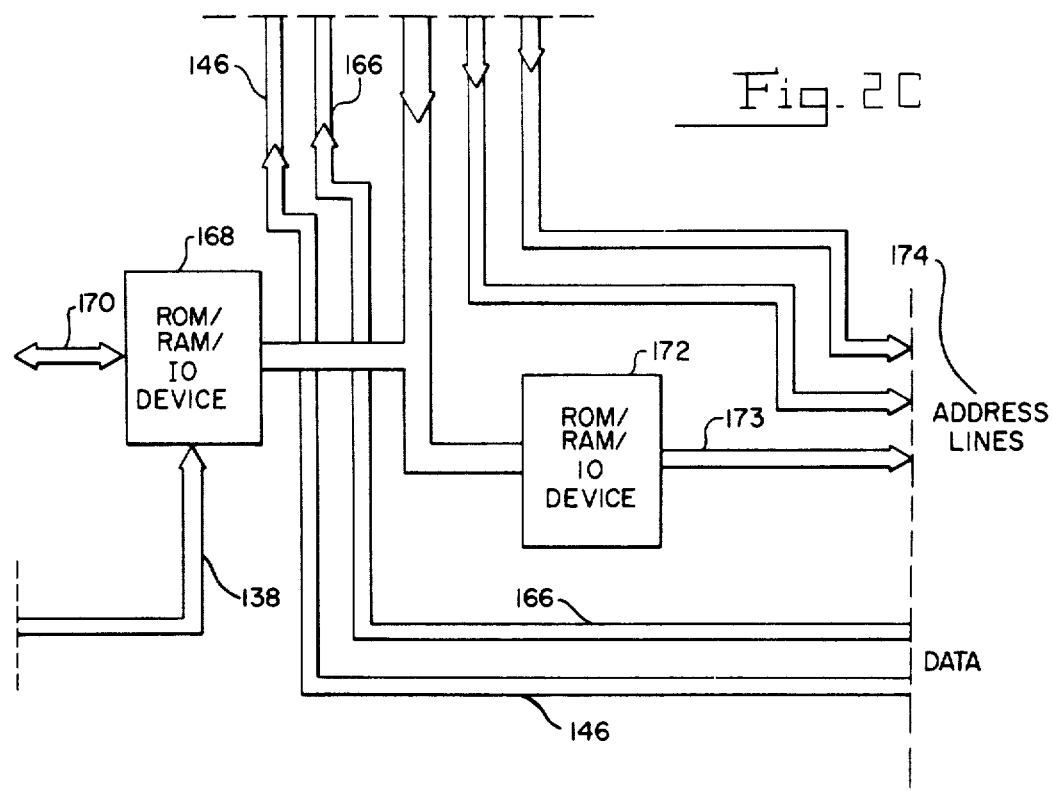

FIG. 2a, 2b and 2c taken together provide a more detailed schematic diagram of the system processor 10. The interprocessor connections described generally with reference to FIG. 1 are shown at the left of FIG. 2a while the system input/output connections and the internal system processor connections are shown generally in FIGS. 2b and 2c.

Beginning at the upper left hand corner of FIG. 2a, the test, reset and weight mode lines 42 from the system processor to the scale subsystem processor 14 are shown in more detail. The test line 50 includes a slide switch 52 which can be manually positioned to establish either a positive 5 volt potential or a ground potential at line 50. Test line 54 and weight-mode line 55 include similar slide switches 56 and 57, respectively. When the slide switch 52 is moved to the left to establish a positive 5 volt potential on test line 50, the system processor and the scale processor enter a test mode in which communications with all other processors is inhibited. In the test mode, the scale will output the five least significant weight data signals in binary coded decimal format over the serial data bus. This information will be displayed on the display associated with the system processor 10 for use by a service man.

The reset signal supplied over line 54 is used to signal the scale subsystem processor to reset or re-zone the scale. The weight mode signal is used to determine wether the scale output presents pounds and ounces or kilograms and grams.

An interlock terminal 58 is connected to a 5 volt source through a voltage dropping resistor. When the scale subsystem processor is in place, the terminal 54 is connected to a ground in the subsystem. If the scale subsystem is not in place, terminal 54 carries the +5 volt potential of the source. System processor 10 monitors the voltage of terminal 54 to be sure the scale is in place.

The system includes a clock circuit 60 connected to the interprocessor CLK A bus through a line circuit 62. The clock circuit 60 interfaces with a processor 64, dedicated primarily to controlling interprocessor communications. Line driver circuit 62 could be one stage of a tri-state line transceiver circuit such as the DS8833 integrated circuit available from National Semiconductor Corporation. Each stage of this transceiver circuit can be used both as a line driver or as a line receiver in interfacing TTL circuits with MOS circuits. Each stage is also capable of entering a high impedance state in which the circuit appears as an open circuit to the connected systems.

As a matter of convention, a transceiver circuit (such as a line driver 62) used only to drive one of the interprocessor communication busses is referred to only as a line driver circuit. If a transceiver circuit is used only to receive signals, that circuit is described as a line receiver circuit. Where the signal flow is bidirectional, the circuit is identified as a line driver/receiver circuit.

The output 66 from the line driver circuit 62 is applied both to a CLK A bus 68 coupled to the scale subsystem processor 14 and to a CLK A bus 70 shared by the postage printing subsystem processor 18 and the peripheral subsystem processor 22.

The individual ATTN signals are provided by processor 64 through separate line driver circuits 72, 74 and 76. The output of line driver circuit 72 is an ATTN 1 signal supplied over dedicated line 78 to the scale processor 14. The outputs from the line driver circuits 74 and 76 are, respectively, and ATTN 2 signal supplied over line 80 to the postage printing subsystem processor 18 and an ATTN 3 signal applied on line 82 to the peripherals subsystem processor 22.

As indicated above, a single attention line is dedicated to each different subsystem processor while the ACK lines may be shared by the subsystems.

For that reason, an ACK line 84 from the scale subsystem processor 14 and an ACK line 86 shared by the postage printing subsystem processor 18 and the peripherals subsystem processor 22 are combined to provide a single ACK input 88 to a line receiver circuit 90 at processor 64.

Connections for those signals which can originate either at the system processor or at one of the subsystem processors, depending on which of the processors is transmitting, are also shown. Data shifting pulses are provided over SHCLK line 92 to the scale subsystem processor 14 and SHCLK line 94 shared by the postage printing subsystem processor 18 and peripherals subsystem processor 22. These two lines are connected through a common line 96 to a line driver/receiver circuit 98 having a direct output connection 100 and an input connection to the processor 64 through a high impedance switching circuit 102. When the processor 64 is the transmitting processor, line driver/receiver circuit 98 is conditioned by a control circuit 104 to transmit output SHCLK pulses from processor 64 to the SHCLK terminals 92 and 94. Only the processor previously addressed by a signal on one of the dedicated ATTN lines will, however, be conditioned to accept the SHCLK pulses. The line driver/receiver circuits of non-addressed processors will be in their high impedance states and will effectively block SHCLK signals to their processors.

When the processor 64 is the receiving processor, line driver/receiver circuit 98 is conditioned by circuit 104 to accept SHCLK pulses over common connection 96 from either of the SHCLK lines 92 and 94.

The connections between the processor 64 and the other processors in the system include the RDY bus 106 to the scale subsystem processor 14 and RDY bus 108 to the postage printing subsystem processor 18 and peripherals subsystem processor 22. These two RDY busses have a common connection 110 to a line driver/receiver circuit 112 having an input connection 114 to the processor 64. The output connection for the line driver/receiver circuit 112 is a 5 volt source. Whenever circuit 112 is conditioned to operate in its driver mode, this 5 volt signal is supplied over common connection 110 to the RDY busses 106 and 108.

The serial data bus by which all data is transferred from one processor to another in the system is also a shared bus. The data bus includes a first connection 116 to the scale subsystem processor 14 and another connection 118 shared by the postage printing subsystem processor 18 and the peripherals subsystem processor 22. A single lead 120 from 116 and 118 is tied to a line driver/receiver circuit 122 having an input connection 124 and an output connection 126 to the processor 64.

Figure 3:
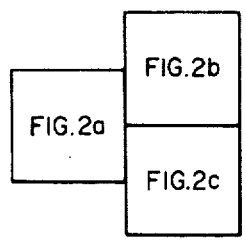
FIG. 3 illustrates the proper orientation of FIGS. 2a, 2b and 2c.

While the processor 64 is defined as part of the system processor 10, processor 64 is dedicated primarily to controlling communications with other processors in the complete system. Processor 64 serves a supporting role relative to a central processor unit 140 to which it is connected through a four line signal path 142 shown both in FIG. 2a and 2b. As indicated by FIG. 3, the overall system is laid out with FIG. 2b and 2c being located to the right of FIG. 2a. Connections common to the different figures are represented by cable connections which, if extended, would continue into similar cable connections in adjoining figures. For example, if cable 142 were extended from the right side of FIG. 2a, it would continue into the cable 142 shown to the left side of FIG. 2b. While the system has been broken down for purposes of illustration by the use of such discontinuous cable, it should be understood that cables bearing the same number in different Figures are actually the same, continuing cable.

The four bit parallel output from processor 64 at cable 142 is supplied to the central processing unit 140 at input/output terminals connected to a cable 144. Postage rate data is similarly applied to the central processing unit 140 through cable 144 from a four bit lead 146 to a postal rate read only memory to be described in more detail later.

The central processing unit 140 controls a digital display 150 through a four bit parallel output to a set 148 of bistable latches and another four bit parallel output 152 applied directly to the digital display 150. In a preferred embodiment of the invention, the central processing unit 140 is also connected to a ROM/RAM/IO device 154 which, as the name indicates, contains read only memory storage locations, random access read/write storage locations and input/output ports. Device 154 may, by itself, be conventional in nature. For example, an A17 integrated circuit chip manufactured by Rockwell International Corporation provides each of the functions of device 154.

The primary output from ROM/RAM/IO device 154 is set 156 of strobe outputs which are used to sequentially strobe or energize both the individual digits in the digital display 150 and columns of key-actuated switches in a system keyboard 158. The device 154 also includes chip select outputs 160 for permitting the central processor unit to address other ROM/RAM/IO units via unit 154.

Another of the ROM/RAM/IO devices included within system processor 10 is device 162 which provides read only and read/write storage locations and a multiple bit output 164 which can be decoded to drive indicator lamps in the keyboard and lamp circuit 158. As will be explained in more detail later, the keyboard 158 can provide data from up to forty keys through four parallel leads 166 to the central processing unit 140 to identify which keys on the keyboard are depressed.

Referring to FIG. 2c, the system processor includes a third ROM/RAM/IO device 168 to which cable 138 is connected. The device 168 also communicates directly with the processor 64 through five parallel input/output leads 170. Device 168 communicates with the central processor unit 140 and with a fourth ROM/RAM/IO device 172. Device 172 has a four bit output which, in combination with two other four bit outputs from the central processing unit 140, provide a twelve bit address for accessing read only memory 174 to retrieve postage rate information. The required postage rate data is, in one embodiment, stored on several read only memory chips. For that reason, some of the twelve bits of addressing information is necessarily used to select the chip from which postage data is to be retrieved with the remaining bits being used to select a particular storage location on that chip. Postage data retrieved from the memory 174 is presented in parallel over two four bits cables 146 and 166, also shown in FIG. 2b. All data provided over the eight data lines is input to the central processing unit 140.

Figure 4:
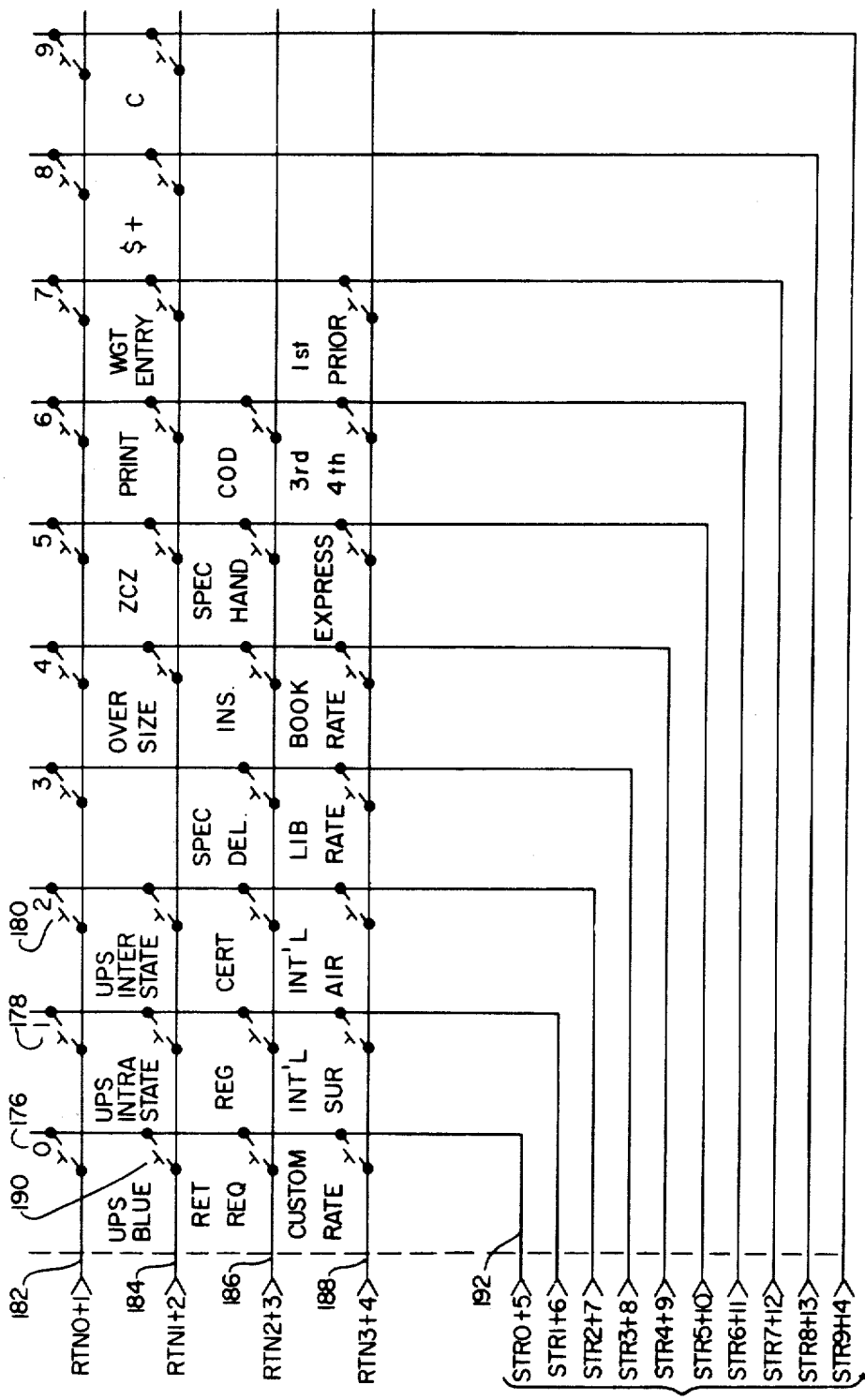
FIG. 4 is a schematic representation of the electrical connections of the keyboard data entry subsystem.

The number of keys in the keyboard of the system may vary, depending upon the complexity of the functions which the system is expected to serve. In a preferred embodiment of the system, up to 40 different key depressions can be detected by arranging the keys of the keyboard in a row and column matrix with each of the rows having a common connection to a keyboard return to the system and each of the columns having a common connection to a strobe output from the system. Such an arrangement is illustrated in FIG. 4 wherein three complete columns 176, 178 and 180 of key connections are shown. Each column is connected to one of ten strobe outputs from ROM/RAM/IO device 154. The device 154 sequentially raises these strobe outputs to provide a binary one signal which ripples across the array of strobe connections. If a switch at the junction of a particular column and a particular row is closed or depressed when the strobe line is energized, the binary one signal is transmitted on the return back to the system. Conversely, if the switch is open when the column voltage is raised to a binary one level, the return will see only an open circuit. As a specific example, if a switch 190 at the junction of column 176 and row 184 is closed when strobe line 192 is driven to a binary one level, the voltage return 184 will carry a binary one signal. If the remaining switches in column 176 are open at the time, a 0100 signal would be read by the system by raising the voltage on the strobe lines in succession, permitting the keyboard to be checked for depressed keys four at a time.

Figure 5:
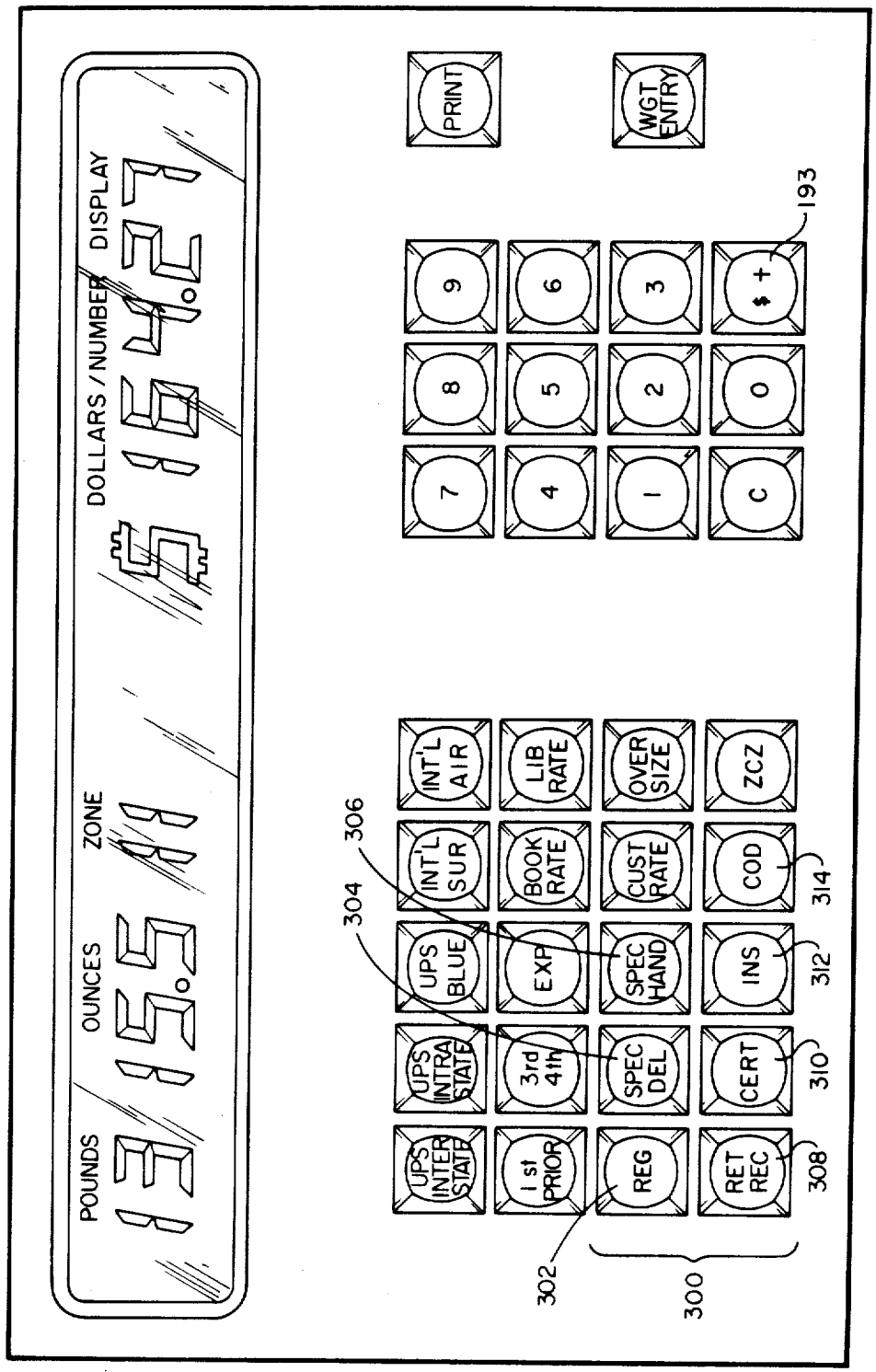
FIG. 5 shows the format of a message transmitted from a scale processor to the system processor.

A preferred keyboard layout is shown in FIG. 5. The keyboard includes a visual display capable of displaying a parcel weight in pounds (or kilograms) and ounces (or grams). The visual display includes a zone section and a dollars/number display at which computed postage amounts are displayed. The dollars/number display can also be used to display error codes for mailing errors such as an overweight package or an invalid mode of shipment.

The keyboard includes a 12 key numerical entry section. The type of information entered through this section can include two digit zone entries for domestic mailings, three digit country codes for International mailings, known postage amounts, and the like. A $+key is provided to permit the user to add special fees not otherwise provided for in the calculator.

A 20 key class of service keyboard section permits the user to select from various U.S. Postal Service classes, United Parcel Service classes or international classes of service. Special fee keys are provided for permitting additional postage to be computed for special services such as registered ail, special delivery mail, insured mail and the like. A ZCZ key calls a zip-to-zone conversion routine. When this routine is called, a user can enter the three digit prefix or the zip code of a domestic destination. The calculator will compute the zone value using the local zip code at the point of origin as a base value.

It will be noted that the keyboard includes only two keys relating to international rate structures. One key specifies that a parcel is to travel by international surface mail while the second key indicates that a parcel is to travel by international; airmail. There are five major rate structures employed by member countries of the International Postal Union for mailing of parcels between member countries. These major rate structures are a letter class, a parcel post class, a printed matter class, a book class and a small packet class. When a user wishes to send a parcel through the international mails, he must select either the air or the surface mode of transportation. A four digit code must also be entered into the calculator through the numerical keyboard. The first digit identifies one of the five classes of service. The last three digits is a code number specifying the country of destination. The manner in which this data is processed is described in more detail later.

The keyboard further includes a Print key by which the user enables a postage meter to actually print the computed postage directly on a parcel or on a tape once the user is satisfied that the proper information has been entered into the calculator.

Normally, the system operates on signals from the scale subsystem processor provided in accordance with a format to be described. However, the keyboard includes a Wt Entry key which permits a user to manually enter the weight of a parcel if it is known to him.

Figure 6:
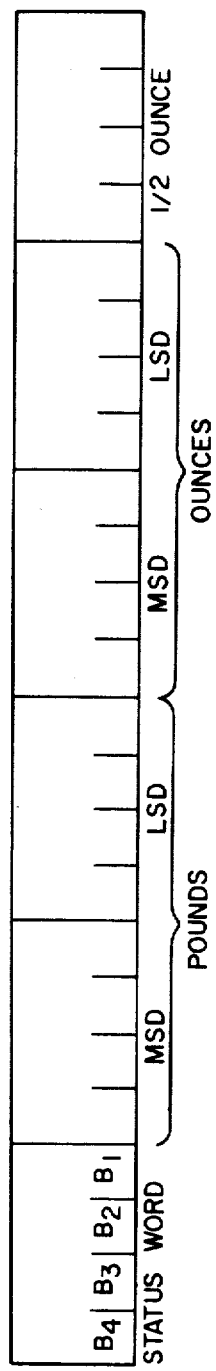
FIG. 6 shows the layout of a keyboard which would be used to enter the necessary data.

The format for data transferred from the scale processor 14 to the system processor 10 is shown in FIG. 6. Scale data is transmitted over the serial data bus in a six word message comprising a status word, plus (in English units) two pound weight information words, two ounce weight information words and one word of half ounce weight information. Where the weight is expressed in metric units, two of the words would represent kilograms while the three remaining words would represent 100 gram, 10 gram and 5 gram weights, respectively. Each word in the message is four bits long. The five weight information words present information in binary coded decimal of BCD format. In a preferred embodiment, the scale is capable of resolving parcel weight to the nearest half ounce or nearest five grams. Therefore, the last information word in the message format is always either 0101 (representing a half ounce or five grams) or 0000, indicating the parcel weight is rounded to the nearest next larger weight unit.

The status word is a four bit word used to convey information about scale operation from the scale subsystem processor 14 to the system processor 10. In one embodiment of the invention, the most significant bit B4 of the status word is being transmitted. Depending upon its intended use, the system may be concurrently connected to a scale having a relatively small capacity, such as 12 pounds, and to a scale having large capacity such as 25 pounds or 70 pounds. The system distinguishes between the 12 pound scale and the other two scales since different data processing steps are required.

Bit B3 is a data validation bit which must possess a predetermined binary value before the system processor will accept the weight information in the message as valid. A data validation bit is necessary in the status word since the scale processor will supply weight information to the system processor upon command without regard to whether the scale has reached an equilibrium condition. The value of bit B3 indicates to the system processor whether the scale is still moving, and therefore generating invalid weight signals, or whether it has reached a steady state or equilibrium condition in which valid weight readings can be taken.

Bit B2 of the status word is an "overweight" bit which indicates to the system processor whether the parcel weight has exceeded the maximum weight which the scale can normally be expected to measure. This bit inhibits the system from treating an overweight package as if it weighed the maximum possible scale weight.

Bit B1 of the status word is a sign bit which is used in checking scale calibration. A negative scale weight reading, preferably indicated by binary one in this bit position of the status word, would indicate that the scale needs to be recalibrated.

The above-described functions of the individual bits in the status word presumes the scale is operating normally. The status word can also be presented by the scale subsystem processor to indicate a malfunction in either the scale element or in the scale processor connected to that element. For example, setting the status word to 1111 might be used to indicate a weighing element malfunction while a status word of 0111 might be used to indicate a scale subsystem processor malfunction.

Figure 8:
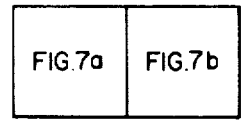
FIG. 8 illustrates the proper orientation of FIGS. 7a and 7b.
Figure 7A:
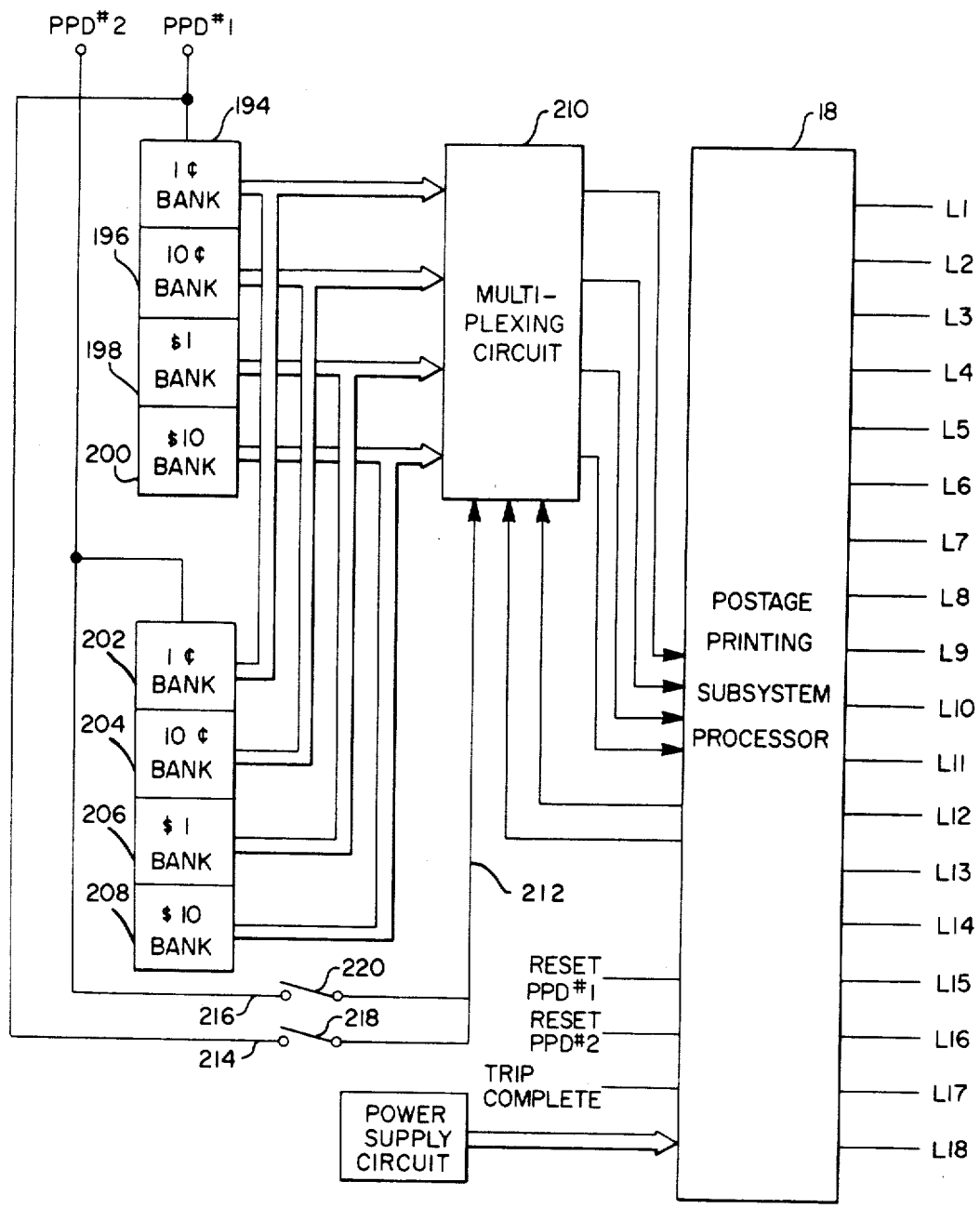
FIG. 7, consisting of FIG. 7a and 7b taken together, is a more detailed schematic diagram of the postage printing subsystem processor with its input and output circuit.
Figure 7B:
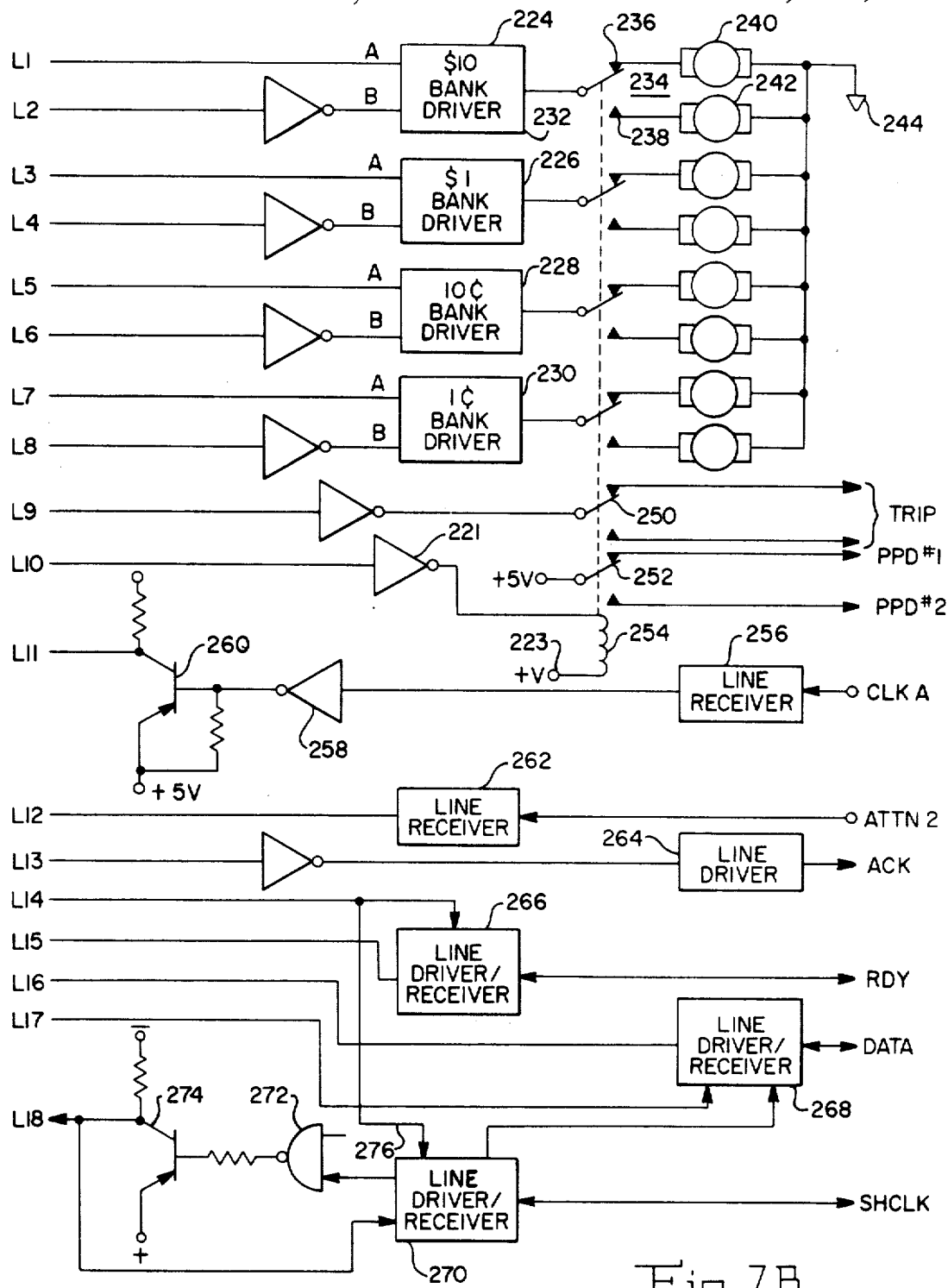

FIGS. 7a and 7b, taken together, provide further details concerning a postage printing subsystem according to a preferred embodiment of the invention. Brief reference should be made to FIG. 8 which establishes the correct orientation of FIGS. 7a and 7b relative to one another.

The postage printing subsystem processor 18 can be used to set either of two postage printing devices identified as printers PPD1 and PPD2. Only the electrical components of these postage printing devices are illustrated. Basically, each device is a four digit printer with each digit or bank being independently settable to a numerical value in the 0–9 range. Referring specifically to FIG. 7a, the current setting of each digit of the PPD1 printer is detected by sensor circuits 194, 196, 198 and 200, each of which provides a multiple bit output which may be decoded to determine the current position of the associated printing element. The current settings of the printing element in the PPD2 printer are monitored by a separate set of sensor circuits 202, 204, 206 and 208.

The sensor outputs for the corresponding digits in the two printing devices are combined at the input to a multiplexing circuit 210, which is also supplied with signals indicating whether one or both of the printing devices are actually in place. These printer-in-place signals are provided over an input 212 which branches to a lead 214 from the PPD1 power circuit and to a lead 216 from a PPD2 power circuit. Branch 214 includes a similar switch 220. If the printing device energized by the corresponding power circuit is in place, the switch in that branch is closed by means of a mechanical interlock. When the power circuit is energized, a positive voltage is established on the input 212 through the closed switch. The lack of a positive voltage on input 212 when a printing device has been nominally selected is interpreted as meaning that the printing device is not actually in place.

In a preferred embodiment, each sensor circuit input to the multiplexing circuit 210 is a three bit word. The multiplexing circuit 210 selects each three bit word in sequence, passing those signals onto the postage printing subsystem processor 18. The multiplexing circuit 210 cannot, of course, distinguish between the three bit words supplied by corresponding sensor circuits in the two sets of circuits; for example sensor circuit 194 and sensor circuit 202. The processor must "remember" which printing device is being monitored in order to know which of the two sets of sensor circuits is not energized and cannot interfere with the reading of the selected sensors.

Other inputs to the postage printing subsystem processor 18 include a RESET PPD1 input, a RESET PPD2 input and a TRIP COMPLETE input. The RESET inputs are operator-initiated inputs which will cause all printing banks of the identified printing device to be reset to zero. The TRIP COMPLETE input is an optical input which indicates to the processor that all mechanical interlocks which might otherwise inhibit a postage printing cycle have been cleared.

Other input/output connections to the postage printing subsystem processor 18 includes a set of leads L1-L18. Of these, L1-L10 provide the control signals for setting the printing devices while leads L11-L18 provide the interface to the other processors in the multiprocessor system.

Lines L1 and L2 are connected to a pair of inputs to a motor driver circuit 224 for the printing elements in the $10 bank of the postage printing devices. A motor driver circuit 226 for the $1 banks is similarly connected to lines L3 and L4 while a motor driver circuit 228 for the $0.10 banks is connected to lines L5 and L6. Finally, motor driver circuit 230 for the $0.01 banks is connected to lines L7 and L8 from the processor 18. An output from each of the motor driver circuits 224, 226, 228 and 230 is connected to one terminal of a single pole double throw (SPDT) switch which permits the motor driver circuit to be connected to either of two electrical motors. For example, the output of motor driver circuit 224 is connected to a terminal 232 of a SPDT switch 234 having contacts 236 and 238. When terminal 232 is tied electrically to the contact 236, the motor driver circuit 224 controls an electric motor 240 which can be driven in either direction to set the printing element in the $10 bank of one of the printing devices to desired positions. Conversely, when the terminal 232 is electrically connected to the contact 238, the motor driver circuit 224 controls a second motor 242 which sets the printing element in the $10 bank of the second printing device.

Each of the motor driver circuits decodes the two inputs it receives from the processors 18 to provide control signals which will cause a positive voltage, a negative voltage or no voltage at all to be applied to the SPDT switch at the circuit output. Since the opposite terminal of each motor is connected to ground, the polarity of the input voltage or the lack of such a voltage determines whether the motors are being driven, and, if so, in what direction. A truth table for the inputs to each of the motor driver circuits is:

| Input | | Motor Output |
|---|---|---|
| A | B | |
| 0 | 0 | Decrease Bank Setting |
| 0 | 1 | Illegal Code-Not Used |
| 1 | 0 | No Change in Bank Setting |
| 1 | 1 | Increase Bank Setting |

A similar SPDT switch 250 connected to out put L9 from processor 222 is used to provide a print-enabling TRIP signal to a selected one of the printing devices once the necessary conditions have been found to exist. Another SPDT switch 252 has its "input" connected to a five volt source and its output terminals connected to the PPD1 and PPD2 power supply terminals shown at the top left corner of FIG. 7a.

All of the above-described SPDT switches are ganged for synchronous operation under the control of a solenoid 254 having its lower terminal connected to a positive voltage source 223 and its upper terminal connected through an inverter 221 to line L10 from postage printing device processor 222. When the solenoid 254 is de-energized by driving the output of inverter 221 to the level of the voltage from source 223, the blade of each of the switches remains in its upper position. In the upper position, drive motors for printing device PPD1 are connected to the motor driver circuits 224, 226 and 228 and 230 while the five volt source is connected through switch 252 to provide power for the sensor circuits 194, 196, 198 and 200 for device PPD1. Conversely, when the solenoid 254 is energized, the SPDT switches are set to their lower positions wherein the setting motors for printing device PPD2 are connected to switch 252.

The postage printing subsystem processor 18 interfaces with the other processors in the system through lines L11–L18. The system clock or CLK A signals are applied to line receiver circuit 256 which drives an inverter amplifier 258 at the input to a high impedance switching circuit 260. The output from the switching circuit 260 is connected to terminal L11 to provide clock pulses for synchronizing operations within the postage printing subsystem processor 222 with operations elsewhere in the system.

The attention signal ATTN2 dedicated to the postage printing subsystem processor 18 is applied to terminal L12 through a line receiver circuit 262 while the acknowledgement signal ACK provided by the processor 18 in response to the ATTN2 signal is output from terminal L13 through a line driver circuit 264.

RDY signals originating elsewhere in the system are applied to terminal L15 of the processor 18 through a line driver/receiver circuit 266 while RDY signals originating within processor 18 are output from terminal L14 to the circuit 266.

The serial data bus over which the processor 18 exchanges status information and data with the remainder of the system includes a line driver/receiver circuit 268 through which incoming data can be applied to terminal L16 of the processor 18. Data originating within the processor 18 is output from terminal L17 to the line driver/receiver circuit 268.

SHCLK pulses used in transmitting data to and from the processor 19 one bit at a time are applied through line driver/receiver circuit 270. Incoming SHCLK pulses are applied through circuit 270 and serially-connected inverter gate 272 to a high impedance switching circuit 274, the output of which is connected to terminal L18 of the processor 18. Outgoing SHCLK pulses are generated only when such pulses appear on terminal L18 while a connection 276 from terminal L14 to the line driver/receiver circuit 270 indicates that the outgoing RDY line is also high. When both conditions are satisfied, line driver/receiver circuit 270 passes data shifting pulses to line driver/receiver circuit 268 in the DATA bus circuit to permit data to be transmitted from the processor 18 onto the serial bus.

Software and stored data, used in combination with the above-described hardware to compute special fee values and total postage values, is described with respect to the remaining figures of this application. It is to be understood that a base postage value is computed in the manner taught in the incorporated Dlugos reference, preferably first, and adjusted in accordance with special fee values determined as described below.

The type of memory employed for a preferred embodiment of the subject invention employs eight bit words, referred to generally as storage bytes. These storage bytes may be encoded in various formats. The most common divides each byte into two four bit groups, each encoded as a hexadecimal (base 16) number. The storage bytes may also be encoded either as an unsigned eight bit binary number or as a signed seven bit binary number, the sign being indicated by the most significant digit. Certain FLAG words are actually micro-instruction words within which specific bits are interpreted as having specific meansing depending on their binary value. These FLAG words are used to define the remainder of a chart in which they appear or to control postage computation or printing steps.

Unless stated otherwise, it can be assumed that any table entry is in the form of two four bit words encoded in hexadecimal format.

The special fee mask or rate screen consists of two rate screens: a rate keycode byte and a rate keyscreen byte. FIG. 9 represents the format of a rate keycode byte used in the USPS system to indicate which special fees are allowable with a specific key. Bit $B_7$ is always set to binary one in this byte. A binary one in bit $B_6$ indicates that the parcel is to be mailed by surface transporation internationally; a binary one in bit $B_5$ indicates that the method of shipment is to be by air internationally. A binary one in bit $B_4$ indicates library rate; in bit $B_3$ indicates book rate; in bit $B_2$ indicates express rate; in bit $B_1$ indicates third or fourth class; and in bit $B_0$ indicates first class or priority rate.

Similarly, the format of the rate keycode byte used in the United Parcel Service (USPS) system is shown in FIG. 10. Bit $B_7$ is always set to binary zero in this byte. Bits $B_3$–$B_6$ are always unused. A binary one in bit $B_2$ indicates that the parcel is to be mailed by air. A binary one in bit $B_1$ indicates the intrastate rate and in bit $B_0$ indicates the interstate rate.

The keyscreen byte is used to indicate which rate key has been pressed. This keyscreen byte can be either one of two: a rate keyscreen or a special fee keyscreen, the format of which is shown in FIG. 11. Referring now to the format of the rate keyscreen byte (FIG. 11), a binary one in bit $B_7$ indicates that the RET REC (return receipt) key on the keyboard was pressed; in bit $B_6$ indicates the REG (registered) key; in bit $B_5$ indicates the CERT (certified) key; in bit $B_4$ indicates the SPEC DEL (special delivery) key; in bit $B_3$ indicates the INS (insurance) key; in bit $B_2$ indicated the SPEC HAND (special handling) key; and in bit $B_1$ indicates the COD (cash on delivery) key was pressed. Bit $B_0$ is the NO KEY SPECIAL FEE bit, described in greater detail hereinbelow.

When calculating special fees, restrictions based on postal service regulations must be considered. That is, certain special fees may not be used with certain postal classes, e.g., a parcel cannot be mailed C.0.D. third class. In addition to the postal service restrictions, another type of restriction often occurs with special fee calculations. That is, often calculation based on the depression of one special fee key requires that another key or keys be pressed immediately prior thereto.

For dealing with such key code restrictions, other headers are required. The format of the special fee main header is shown in FIG. 12. This special fee main header indicates which restrictions are to follow. A binary one in bit $B_7$ indicates that a fee is to be added to or subtracted from to the rate previously calculated and that the toal result becomes the output fee. A binary zero in this $B_7$ position indicates that the rate is replaced by the fee. A binary one in bit $B_6$ indicates that special fee key restrictions are present. A binary one in bit $B_5$ indicates that a weight restriction exists; in bit $B_4$ indicates that an insurance restriction exists. The setting of bit $B_3$ indicates whether the calculated fee is to be added to ($B_2=1$), or subtracted from ($B_2=0$), the total. Bits $B_0$–$B_2$ are used to indicate the number of restriction sets that are applicable and therefore that must be considered.

The rate keycode and the keyscreen bytes are used in conjunction with other chart headers. Three types of special fee charts are used by the system: weight oriented charts, value oriented charts and fixed fee charts. Weight oriented charts include information for calculating fees based on the weight of the parcel to be mailed. Value oriented charts include information for calculating fees based on the declared value of the contents of the parcel to be mailed. Finally, fixed fee (or dollar) charts include information for calculating fees, which information is independent of the weight or the value of the parcel to be mailed.

The special fee sub header, shown in FIG. 13, reflects the status of weight, value and dollar charts. System control can be incremented through the rate chart when more than seven values follow the present location in the rate chart. Bits $B_7$ and $B_6$ are always set to binary one in this header. A binary one in bit $B_5$ indicates that this header is to be used as a dollar header; a binary zero indicates that this header is to be used either a weight or value header. A binary one in bit $B_4$ indicates before the operation was performed; binary zero indicates that the number of bytes to be considered is one more than before the operation was performed; binary zero indicates that the number of bytes has not changed. Bits $B_0$–$B_2$ are used to indicate the number of bytes that are applicable and therefore that must be considered.

The special fee chart header, shown in FIG. 14, indicates whether a dollar value or a weight has been entered and directs the system to consider the appropriate chart. A binary one in bit $B_7$ indicates that the header is used for weight restriction; a binary zero indicates that the header is used for value restriction. A binary one in bit $B_6$ indicates pounds, kilograms or dollars; a binary zero indicates ounces, grams or cents. Bits $B_4$ and $B_5$ are used to indicate the number of value bytes to be considered. A binary one in bit $B_3$ indicates that the value of incoming data must be less than or equal to the value in memory; a binary zero indicates that the value of incoming data must be greater than the value in memory. Bits $B_0-B_2$ are used to indicate the number of value sets that are applicable and therefore that must be considered.

The special fee dollar header, shown in FIG. 15, indicates that dollars and/or cents must be read. Bits $B_5-B_7$ binary one in this byte. A binary one in bit $B_4$ indicates dollars; a binary zero indicates cents. A binary one in bit $B_3$ indicates that the number of bytes to be considered is one more than before the operation was performed; binary zero indicates that the number of bytes has not changed. Bits $B_0-B_2$ are used to indicate the number of bytes that are applicable and therefore that must be considered.

Reference should now be made to the following program outline used to described the operation of the special fee sub-program.

---
Special Fee Calculating Program Outline
---
Perform Decode Fee
Perform Read and Store Main Header
If Subtract Fee
Set Subtract Flag
Continue
Else Continue
Perform Read and Store Keycode Restriction
If Fee is Not Valid With Postal Class
End Module
Else If Special Fee Restriction Present
Perform Read and Store Restriction
If Fee Does Not Pass Restriction
Set Soft Error Flag
Else Set Restrictions Met Flag
Continue
Else If Weight Restriction
Perform Read and Store Weight Restriction
If Fee Does Not Pass Weight Restriction
Set Soft Error
Else: Continue
Else: If Insurance Restriction
Perform Read and Store Restriction
If Fee Doest Not Pass Insurance Restriction
If Other Restrictions Were Met
Reset Soft Error
Go to 100
Else: Set Soft Error
100: Else: Else: If Soft Error
If Last Restriction
Perform Clean Up
End Module
Else: Perform Check in Restriction Set
Else: Perform Read Keyscreen
If Fee Incompatible With Existing Fee
Reset All Bad Fees
Set Redo Flag
Continue
Else Peform Read Chart Header
If Value Needed
If No Value Entered
Ask for Dollar Value
End Module
Else: Else Do while Headers Available
If Correct Range
If Add Fee
And Fee to Dollar Total
End Module
If Value Greater Than 5 Digits
Shift Digits Down 2 Locations
Point At 1,000,000 Chart
Continue
Else If Subtract Fee
Subtract Fee From Dollar Total
Else: Replace Total With Fee
Else: Point at Next Range
Continue Do While
End Do While: If Value Fee
Ask for Dollar Value
End Module ---
Special Fee Calculating Program Outline -continued
---
Else End Module In analyzing the above program outline, hereinafter the term "return" is used to signify that the system monitor resumes control.

In operation, the special fee subprogram runs in the following manner after a user enters a special fee from the keyboard. When a rate key is depressed, rate screens, FIG. 11, are stored in RAM locations. The rate keyscreen, FIG. 11, indicates which speail fees are allowable with the specified rate. The second rate screen stored in RAM is a keycode screen, shown in FIG. 9 (USPS key codes) and Gire 10 (USPS key codes). This rate keycode screen indicates which rate is in effect.

When a special fee key is pressed, the system returns a bit pattern which signifies one of the special fees. The special fee program is then entered. The bit pattern that is returned is then used to vector to the selected special fee address in the ROM.

At this point in program execution, the special fee main header, shown in FIG. 12, is considered. Bit $B_7$ of the main header is checked to determine whether a fee should be added to or subtracted from the total dollar value and whether the rate should be cleared and replaced with the fee.

The special fee main header, FIG. 12, bit $B_3$ indicates whether the fee should be added to or subtracted from the dollar total value. If the fee is to be subtracted, the subtract flag is set. Otherwise, the flag is reset.

In this main header are also restriction bits. These bits are a special key restriction (bit $B_6$), a weight restriction (bit $B_5$) and an insurance restriction (bit $B_4$). Any one of these bits or any combination thereof can exist in the main header.

After the main header is analyzed, the special fee program then determines whether the depressed key is valid with the selected rate. This is done by comparing the bit patten produced by the strobe and return of the fee with the rate keyscreen of special fees (FIG. 11). If this first test is passed, additional special fee restrictions are considered.

The first restriction that is checked is the special fee key restriction. This restriction is used to determine whether a prior special fee should have been pressed in order for this fee to be valid. If this restriction is passed, the weight restriction is then considered. A weight restriction is the maximum weight for a certain fee. If the maximum weight is exceeded, this restriction is not passed, and the system returns. If this weight restriction is passed, however, the system then determines whether an insurance restriction exists.

If an insurance restriction exists, the dollar value that was entered for the insurance key is compared to the dollar value required for insurance for this special fee. Note however that this insurance restriction first requires that an insurance key be depressed. Once the system passes the insurance restriction, fee calculation continues.

After the above restrictions are met the system then determines whether the current fee is compatible with previously selected fees. If it is not, all incompatible fees are cancelled and all remaining fees are recalculated.

After all the restriction sets are met, the system determines whether the fee is value oriented or weight oriented by referring to the special fee chart header, FIG. 14. If the fee is a value oriented fee, the system determines whether a value was entered for the fee. If a value was not entered for the fee the system requests a dollar value from the user by displaying a $--- sign on the display while the system returns. If a dollar value is entered at this point, fee calculation continues. The dollar value or the weight for this fee then determines which chart should be considered next.

The special fee dollar header, FIG. 15, is then used to calculate the dollar value which is to be added to the fee. The dollar header can also have a subdollar header associated with it. If the initial seven values of the subheader signifies cents only, only one byte is required to indicate each cent. If the next seven values are in dollars and cents, then two bytes will be required to indicate this amount. In FIG. 15, bit $B_3$ indicates that more than one byte is required to represent the dollars and cents amount.

FIG. 13 shows a subheader. This subheader can be used to indicate dollars, weight, or value, depending on the setting of its bit $B_5$.

The subheader, FIG. 13, can change the number of bytes required to indicate the dollar value, thus adding two digits to the dollar value for each additional byte. This is the function of bit $B_3$ in FIG. 13.

After the correct dollar value is found for the fee, it is added to or subtracted from the base rate, as indicated by bit $B_3$ (FIG. 12). The correct dollar value can also replace the base rate, as determined by the setting of bit $B_7$ of the special fee main header (FIG. 12).

As previously mentioned, the system determines whether the fee has passed the special fee key restriction. That is, have the appropriate special fee keys been pressed on the keyboard prior to the determination of the present special fee calculation? This determination is made by consulting the special fee restriction header, FIG. 11. If a bit is set in this special fee restriction header, it indicates that the special fee being calculated requires that one of the special fee categoreies had to have been set previously.

The system then determines whether a fee for a previous special fee key had been calculated by consulting the Special Fee Complete registers in RAM. The Special Fee Complete registers are identical to the special fee keyscreen header, FIG. 11. The system builds the Special Fee Complete registers as new special fees are calculated. Consequently, the Special Fee Complete registers are constantly updated.

During the processing, the system determines whether the special fee under consideration has passed the restrictions which were relevant as determined by the special fee main header in conjunction with the special fee keyscreen header. If the special fee being calculated does not pass restrictions, a soft error flag is set. The reason a soft error, rather than a hard error, flag is set is that there may be numerous restriction sets and if the first restriction (e.g., special fee key restriction) is not passed, subsequent restrictions may be passed; in such a case, the soft error is subsequently voided. If the special fee being calculated does pass the restriction, the soft error flag is cleared.

When the system consults the special fee main header, FIG. 12, it determines whether a weight restriction is present by determining whether bit $B_5$ is set. If such a weight restriction is present, the weight restriction is read from ROM and stored in RAM.

The system then reads the weight and compares it to the value stored in the ROM. For these purposes the special fee weight restriction chart header, identical to the special fee chart header shown in FIG. 14, is consulted. This header indicates whether the weight entered should be greater than or less than the value read in from the ROM. Also in this header is information concerning the weight itself: ounces or pounds and ounces. If the fee does not pass the weight restriction as indicated above, a soft error flag is set. If the fee does pass the weight restriction, the system performs the check insurance restriction module.

The system reads the insurance data consisting of the insurance restriction and insurance mask. This insurance mask is identical to the special fee keyscreen shown in FIG. 11, with bit $B_3$ set only. This insurance data is stored in RAM. If the special fee does not pass the insurance restriction as determined by consulting these headers, but does pass either the special fee key restriction or the weight restriction, then the soft error flag is cleared and restriction checking is terminated. If, however, the special fee does not pass the insurance restriction and neitherof the other restrictions (special fee restriction or weight restriction) was passed, the soft error flag is set. If the fee does not pass the insurance restriction but other restrictions were met and the soft error flag was cleared, the system then resumes processing at the module entitled Check Soft Error Flag.

The system determines whether the soft error flag has been set in any of the previous modules (e.g., the special fee restriction the weight restriction, or the insurance restriction module). If the soft error flag is set, the system then determines whether all restrictions have been handled. If no restrictions remain to be handled, the system resets all flags that have been set in previous modules and the system returns control to the monitor. If the soft error flag has been set and there are still restrictions that remain to be tested, the system then returns to the checked special fee restriction module and continues to handle the restrictions in the order hereinabove described. This process continues until either the restrictions are exhaused or the soft error flag is cleared.

If, however, no soft error flag was set, the system continues processing.

If no restrictions of any sort are present, the system reads the keyscreen as shown in the special fee keyscreen header, FIG. 11. The system determines whether the present fee is incompatible with existing fees completed, as indicated by the Special Fees Complete register as described above. If the fee is incompatible, all bad fees are reset in the Special Fee Complete register and a redo flag is set. The redo flag indicates that the fee that is being calculated is incompatible with previous fees completed and that all such previously incompatible fees must be cleared. All originally compatible fees are recalculated.

If there are no incompatible fees or if the redo flag has been set, the system reads the special chart header, FIG. 14. The system then determines whether a dollar value is needed for the fee in question (as indicated by a zero in bit $B_7$) and whether a dollar value has been entered, if required. If the system determines that a value has not been entered, it prompts the operator for a dollar value. The display shows the following characters: $---. The system then returns control to the monitor.

For certain special fees, if the dollar value entered has more than 5 digits, the system will round-up the dollar value to the nearest 100 if the value is not an even 100 and shift the resulting digits down 2 locations. The system will then use an additional vector to point at the upper section of the appropraite two section special fee charts covering dollar values from $100,000 to $9,999,999.

If a value is not needed for the fee or if a value was needed and previously entered, the system determines the correct range for the dollar value entered. This is performed by indexing through chart headers such as that shown in FIG. 14 and through subchart headers such as that shown in FIG. 13 until a successful comparison is made between value entered for the weight entered and the values taken from rate ROM. The special fee subchart header (FIG. 13) is used when there are more than seven value sets indicated by bits $B_0$–$B_2$ of the special fee chart header, FIG. 14; or bits $B_0$–$B_2$ of previous special fee subchart headers (FIG. 13). The special fee subchart header can also be accessed when the number of value bits shown in bits $B_4$–$B_5$ of the special fee chart header increases or decreases from the values shown in the previous chart header. This can occur, for example, when the value required goes from ounces to pounds and ounces.

If the correct range has been determined, the system indexes through the dollar headers, FIG. 15, and increments to the correct dollar value. If the fee is to be added, as indicated by bit $B_3$ of the special fee main header, FIG. 12, the system adds this special fee to the base rate and returns control to the monitor. If the fee is to be subtracted, however, the system subtracts the special fee from the base rate and returns control to the monitor.

Finally, if the fee is to replace the base rate, as indicated in the special fee main header as bit $B_7$ FIG. 12, the system replaces the base rate with the special fee and the control returns to the monitor. If the value is not found within the first header's range subheaders are still available, the subheader is read and stored and processing continues. Subsequent headers are thereby checked for the correct range. The subheaders hereinabove described are shown in FIG. 13 as special fee subchart headers.

If there are no more subheaders available and the system determines that the fee requires a dollar value, the system prompts the operator for a dollar value. The display showns the following characters: $---. At this point control returns to the monitor. If the special fee is not value oriented the system merely returns control to the monitor.

In a preferred embodiment dollar value oriented fees based on amounts in excess of $99,999 may be handled for special fees such as for Registered Mail or Insurance. Charts for such fees are divided into two sections, one covering dollar values up to $99,999, in $1 increments, and the other covering dollar amounts up to $9,999,999 in $100 dollar increments. As the dollar value for such a dollar value oriented fee is entered the program counts the number of digits entered. If five or fewer digits are entered the lower section of the chart is used and the program is executed as herein discribed without modification. If six or seven digits are entered the ZONE section 301 displays the most significant digit or digits of the dollar value entered while the DOLLARS/NUMBERS section 303 displays the five least significant digits. The program then rounds the dollar value entered upwards to the nearest hundred dollars and uses the rounded dollar value to access the upper section of the table. The program then continues as herein described without further modification.

In a preferred embodiment, the systems central processing unit 140 may be a PPS-4/1 one chip microcomputer, MM-76 series. The communications controller/processor 64 is an A-79 processor chip. The scale subsystem processor and the peripheral subsystem processor are preferably MM-78 Series microcomputers while the postage printer subsystem processor is preferably a MM-77 Series microcomputer. All of the foregoing microcomputer products are manufactured by Rockwell International Corporation of Anaheim, Calif.

Instruction Sets for programming these devices are disclosed in Product Description, MM-76 Series, March 1977, Revision: 3, 29410N41, and Product Description, MM-77 and MM-78, March 1977, Revision: 3, 29410N42, both available from Rockwell International Corp.

Given the rate chart formats described herein, the actual rate charts can be constructed using data published by the U.S. Postal Service and the United Parcel Service.

While there has been described what is considered to be a preferred embodiment of the invention, variations and modifications therein will occur to those skilled in the art when they become acquainted with the basic concepts of the invention. Therefore, it is intended that the appended claims shall be construed to include the preferred embodiment and all such variations and modifications as fall within the true spirit and scope of the invention.

What is claimed is:

1. An apparatus for determining postage for items to be mailed, comprising:
    (a) means for determining the weight of said items;
    (b) data entry means for entering data necessary to determine the postage value applicable to said items, said data including data defining special fees, if any, applicable to each of said items;
    (c) processor means operatively associated with said weight determining means and said data entry means, for determining the postage value applicable to each of said items, said processing means further comprising memory means for storing first tables of data defining base postage rates, and second tables defining special fee rates said special fees including dollar value oriented special fees which are determined in accordance with an entered dollar value, and said second tables including two section tables defining special fee rates for dollar value oriented special fees determined in accordance with entered dollar values which may be greater than a predetermined amount, said two section tables comprising a lower section defining special fee rates for entered dollar values ranging up to and including said predetermined amount in unit increments and an upper section defining special fee rates for entered dollar values ranging up from said predetermined amount in increments greater than unity; and
    (d) said processor means responding to said determined weights and applicable entered data to select a base postage value for each of said items, and responding to said determined weights and said entered data, as applicable, to select special fee values for each of said items to which such special fees apply, and said processor adjusting said base postage values in accordance with said selected special fee values, if any, and outputing said adjusted values, and wherein, in selecting such special fee values, and said processor responds to said entered data, as applicable, to select, when appropriate, dollar value oriented special fee values determined in accordance with an entered dollar value which may be greater than said predetermined amount from said two section tables for each item to which said so determined special fee values apply, said processor selecting such appropriate special fee values from said lower sections for entered dollar values less than or equal to said predetermined amount based on such dollar value as entered, and said processor selecting such appropriate special fee values from said upper section for entered dollar values greater than said predetermined amount, based on such entered dollar values as appropriately rounded.

2. The apparatus of claim 1 wherein said predetermined amount is the largest amount which may be expressed in a predetermined number of digits.

3. The apparatus of claim 2 wherein said processor means counts the digits of said entered dollar value to determine if said entered dollar value is larger than said predetermined amount.

4. The apparatus of claim 2 wherein said entered dollar value may have two digits in excess of said predetermined number of digits.

5. The apparatus of claim 3 wherein said entered dollar value may have two digits in excess of said predetermined number of digits.

6. The apparatus of claim 2 wherein said processor means rounds said entered dollar value to a multiple of one hundred before determining said special fee value if said dollar value is greater than said predetermined amount.

7. The apparatus of claim 3 wherein said processor means rounds said entered dollar value to a multiple of one hundred before determining said special fee value if said dollar value is greater than said predetermined amount.

8. The apparatus of claim 4 wherein said processor means rounds said entered dollar value to a multiple of one hundred before determining said special fee value if said dollar value is greater than said predetermined amount.

9. The apparatus of claim 5 wherein said processor means rounds said entered dollar value to a multiple of one hundred before determining said special fee value if said dollar value is greater than said predetermined amount.

10. The apparatus of claim 6 wherein said dollar value is rounded up to the next one hundred dollar multiple.

11. The apparatus of claim 2 wherein all digits of said entered dollar value are displayed to an operator by said apparatus.

12. The apparatus of claim 4 wherein all digits of said entered dollar value are displayed to an operator by said apparatus.

13. A method for imprinting items to be mailed with appropriate postage values, said posted values being adjusted in accordance with a dollar oriented special fee determined in accordance with a dollar value which may be greater than a predetermined amount comprising the steps of:
(a) determining the weight of one of said items;
(b) inputing said determined weight to a data processor;
(c) inputing data necessary to determine the postage value applicable to said item to said data processor, said data including data necessary to determine a base postage value and data, including a dollar value necessary to determine said dollar value oriented special fee, and the data processor then;
(d) identifying, in accordance with said entered data, a first table defining a base postage rate;
(e) selecting in accordance with said determined weight and said entered data a base postage value applicable to said item from said first table;
(f) identifying, in accordance with said entered data a second, two section table comprising a lower section defining such special fee rates for dollar values ranging up to and including said predetermined amount in unit increments, and an upper section defining such special fee rates for entered dollar values ranging up from said predetermined amount in increments greater than unity;
(g) if said entered dollar amount is less than or equal to said predetermined amount selecting the appropriate special fee balue from said lower section in accordance with said dollar value as entered;
(h) if said entered dollar value is greater than said predetermined amount selecting the appropriate special fee value from said upper section in accordance with said dollar value as appropriately rounded;
(i) adjusting said base postage value in accordance with said special fee value and other special fee values applicable, if any; and
(j) outputing said adjusted value to printing means for printing postage indicia whereby the appropriate postage value is applied to said item.

14. The method of claim 13 wherein said predetermined amount is the maximum amount which may be expressed in a predetermined number of digits.

15. The method of claim 14 wherein said entered dollar value may have two digits in excess of said predetermined number of digits.

16. The method of claim 15 wherein said data processor rounds said entered dollar value to a multiple of one hundred before determining said special fee value if said dollar value is greater than said predetermined amount.

17. The method of claim 16 wherein said entered dollar value is rounded up to the next multiple of one hundred.

* * * * *